US012188617B2

(12) United States Patent
Farines et al.

(10) Patent No.: US 12,188,617 B2
(45) Date of Patent: Jan. 7, 2025

(54) PROTECTIVE DEVICE FOR A PRESSURIZED TANK

(71) Applicant: FAURECIA SYSTEMES D'ECHAPPEMENT, Nanterre (FR)

(72) Inventors: Ludovic Farines, Audincourt (FR); Ludovic Nouvel, Saint Jorioz (FR); Jean-Baptiste Maeso, Belfort (FR); Joël Jolicor, Vieux-Charmont (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 0 days.

(21) Appl. No.: 17/994,485

(22) Filed: Nov. 28, 2022

(65) Prior Publication Data

US 2024/0175545 A1 May 30, 2024

(30) Foreign Application Priority Data

Nov. 30, 2021 (FR) ..................................... 21 12733

(51) Int. Cl.
*F17C 1/16* (2006.01)

(52) U.S. Cl.
CPC ........ *F17C 1/16* (2013.01); *F17C 2201/0109* (2013.01); *F17C 2203/012* (2013.01); *F17C 2203/066* (2013.01); *F17C 2205/0308* (2013.01)

(58) Field of Classification Search
CPC ................ F17C 1/16; F17C 2201/0109; F17C 2203/012; F17C 2203/066; F17C 2205/0308; B65D 5/566; B65D 81/022; B65D 88/128; B65D 88/748
See application file for complete search history.

(56) References Cited

U.S. PATENT DOCUMENTS

| | | | | | |
|---|---|---|---|---|---|
| 4,964,529 | A * | 10/1990 | Houston | F17C 13/084 | 220/601 |
| 5,004,120 | A * | 4/1991 | Hembert | F17C 13/123 | 220/62.19 |
| 7,350,665 | B2 * | 4/2008 | Hembert | F17C 13/123 | 220/592 |
| 7,731,051 | B2 * | 6/2010 | Rohwer | F17C 13/04 | 220/582 |
| 8,474,647 | B2 * | 7/2013 | Vinjamuri | F17C 1/06 | 220/639 |
| 8,628,115 | B2 * | 1/2014 | Schultheis | F17C 13/084 | 280/834 |
| 9,464,758 | B2 * | 10/2016 | Kojima | F16C 1/16 | |
| 11,486,545 | B2 * | 11/2022 | Katano | F17C 1/12 | |

(Continued)

FOREIGN PATENT DOCUMENTS

| | | |
|---|---|---|
| EP | 1029195 A | 8/2000 |
| EP | 1710486 A1 | 10/2006 |

(Continued)

OTHER PUBLICATIONS

French Preliminary Search Report for Application No. 21 12733 dated Jul. 12, 2022.

*Primary Examiner* — Kareen K Thomas
(74) *Attorney, Agent, or Firm* — Carlson, Gaskey & Olds, P.C.

(57) ABSTRACT

A protective device for a pressurized gas tank comprises a shell designed to absorb energy in the event of an impact and a mechanical joining interface to mechanically join the shell to the pressurized gas tank.

15 Claims, 4 Drawing Sheets

(56) References Cited

U.S. PATENT DOCUMENTS

| | | | | |
|---|---|---|---|---|
| 2009/0255940 | A1 * | 10/2009 | Murate | F17C 1/16 220/661 |
| 2019/0203883 | A1 | 7/2019 | Kojima et al. | |

FOREIGN PATENT DOCUMENTS

| | | | |
|---|---|---|---|
| EP | 2905527 | A1 | 8/2015 |
| FR | 2792392 | A1 | 10/2000 |
| JP | 2019206988 | A | 12/2019 |
| WO | 9927293 | A2 | 6/1999 |
| WO | 9927293 | A3 | 7/1999 |

* cited by examiner

[Fig. 1]
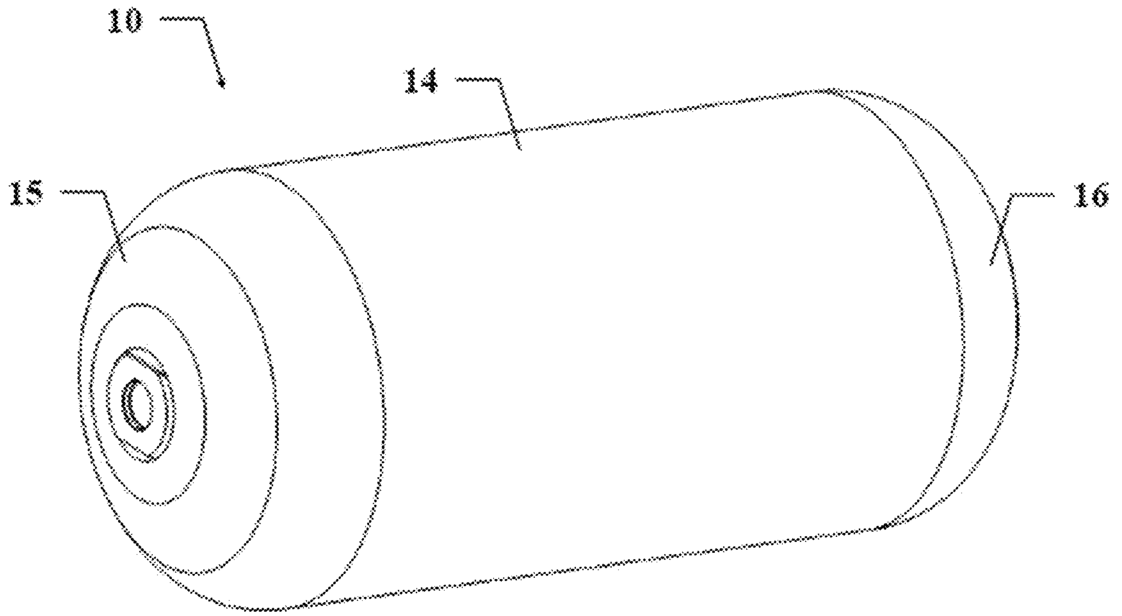
[Fig. 2]
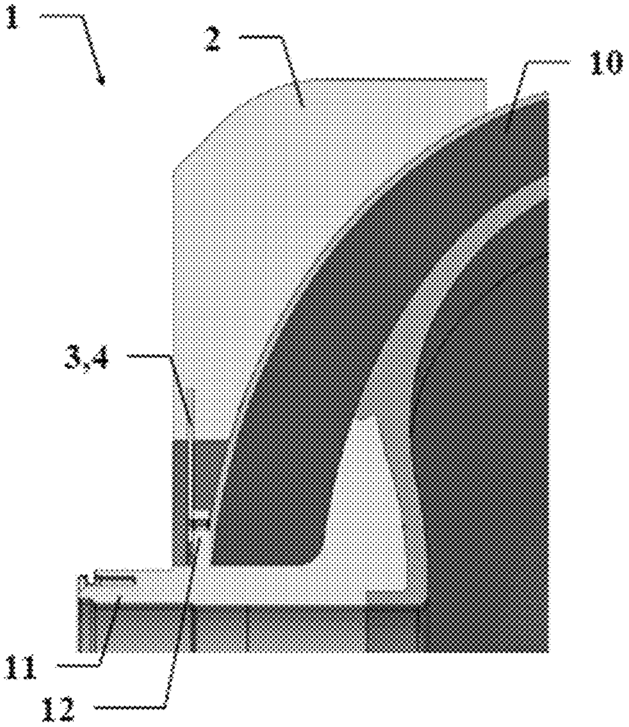

[Fig. 3]
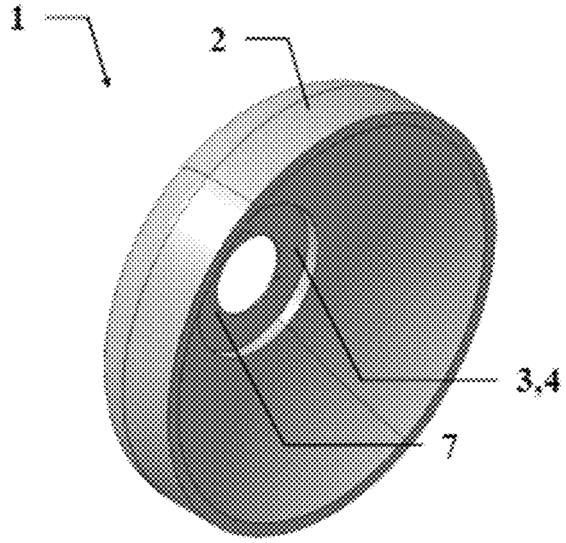
[Fig. 4]
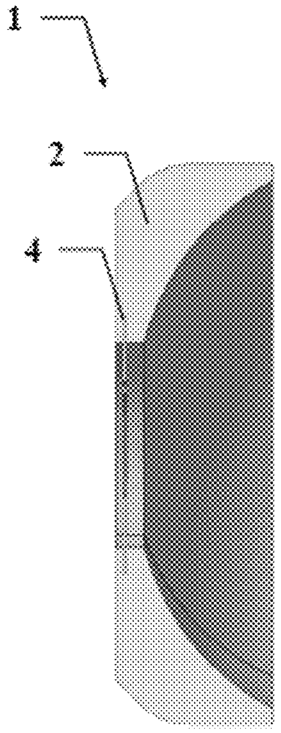

[Fig. 5]
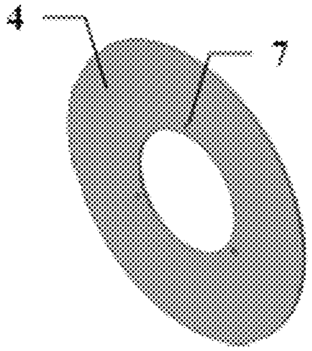
[Fig. 6]
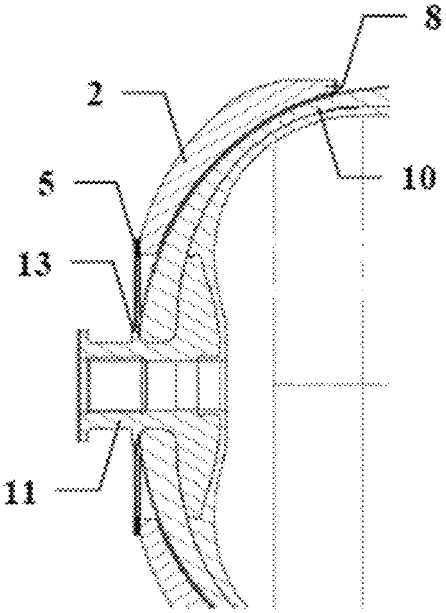

[Fig. 7]
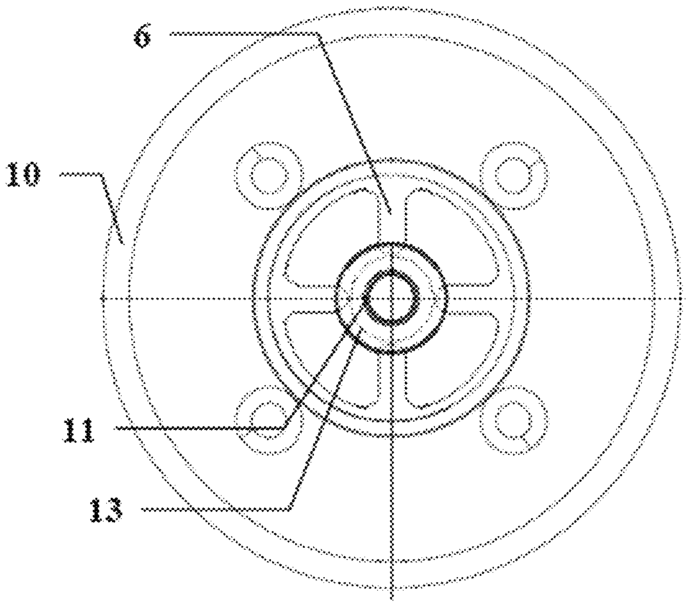
[Fig. 8]
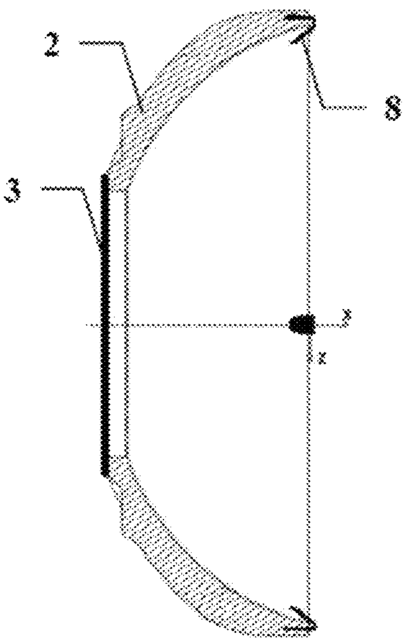

PROTECTIVE DEVICE FOR A PRESSURIZED TANK

CROSS-REFERENCE TO RELATED APPLICATION

This application is a U.S. non-provisional application claiming the benefit of French Application No. 21 12733, filed on Nov. 30, 2021, which is incorporated herein by reference in its entirety.

TECHNICAL FIELD

The disclosure relates to a protective device for a pressurized gas tank.

BACKGROUND

It is known to make a protective device for a tank comprising a shell designed to absorb energy in the event of an impact. Such a shell is typically made of a damping material and is advantageously shaped to match the shape of the tank in the area to be protected.

Such a shell is typically attached to the tank by bonding to the outer surface of the tank. This way of joining is time-consuming (surface preparation, curing time, etc.) and therefore expensive. Moreover, it does not guarantee sufficient durability (at least 20 years).

Thus, other ways of joining are being sought.

SUMMARY

To this end, the disclosure relates to a protective device for a pressurized gas tank, comprising a shell designed to absorb energy in the event of an impact and a mechanical joining interface to mechanically join the shell to the pressurized gas tank.

Particular features or embodiments, which may be used alone or in combination, are:

- the shell is integral with the mechanical joining interface, in that it is made of the same part as, bonded to, or over-molded with the mechanical joining interface,
- the container comprises a base, substantially rotationally symmetrical, and the mechanical joining interface is designed to be assembled with the base,
- the base comprises a shoulder, substantially with rotational symmetry, and the mechanical joining interface comprises a rigid surface complementary to the shoulder and at least one fixing feature to fix the rigid surface to the shoulder, such as a rivet and/or a screw and/or a clip and/or welding,
- the base comprises an outer crown and the mechanical joining interface comprises an elastic ring, capable of protruding from the crown,
- the ring comprises at least two inner tabs, the distal ends of which are capable of protruding from the crown,
- the shell is made of a plastic material, preferably an expanded plastic, even more preferably expanded polystyrene,
- the shell has a shape complementary to the shape of the tank in the area to be protected,
- the shell is designed to be joined to a hemispherical cup of a tank,
- the device further comprises at least one clip on the distal edge of the shell for attachment to the tank.

In a second aspect of the disclosure, a tank comprising at least one such protective device.

The tank has a cylindrical central trunk, terminated at both ends by a hemispherical cap, each protected by such a device.

BRIEF DESCRIPTION OF THE DRAWINGS

The disclosure will be better understood upon reading the following description, given only as an example, and with reference to the attached drawings, in which:

FIG. 1 shows a perspective view of a tank;

FIG. 2 shows a cutaway profile view of a protective device on a tank according to a first embodiment;

FIG. 3 shows a perspective view of a protective device;

FIG. 4 shows a cutaway profile view of the protective device of FIG. 3;

FIG. 5 shows a perspective view of a surface of a joining interface;

FIG. 6 shows a cutaway profile view of a protective device on a tank according to another embodiment;

FIG. 7 shows a face view of the protective device of FIG. 6; and

FIG. 8 shows a cutaway profile view of a protective device according to another embodiment.

DETAILED DESCRIPTION

With reference to FIG. 3, the disclosure relates to a protective device 1 for a pressurized gas tank 10. Such a tank is, for example, a tank for storing a pressurized gas, such as hydrogen, LPG, CNG or similar.

Such a tank 10 typically comprises a structure, for example of composite material. This structure is covered on the inside by an envelope or liner, ensuring that it is water tight. Such a tank 10 further comprises at least one base 11, passing through the wall of the tank and comprising a through pipe, in order to allow filling and drawing of the tank 10.

By regulations, such a tank 10 must be protected against impacts. Also, it is known to cover a part of the tank 10 to be protected by at least one protective device 1.

Such a protective device 1 comprises, in a known manner, a shell 2 designed to absorb energy in the event of an impact. Such a shell is typically made of a damping material to dissipate the energy of an impact. The inner shape of this shell 2 is advantageously complementary to the outer shape of the area of the tank 10 to be protected, so that the shell 2 fits this area to be protected.

According to the prior art, such a shell 2 is attached to the tank 10 by bonding the inner surface of the shell 2 to the outer surface of the tank 10. This way of joining is time-consuming (surface preparation, curing time, etc.) and therefore expensive. Moreover, it does not guarantee sufficient durability, as regulations require at least 20 years. Therefore, an alternative solution to bonding is sought, allowing the device 1 to be joined to the tank 10.

Thus, according to one feature of the disclosure, the protective device 1 further comprises a mechanical joining interface 3, capable of allowing the shell 2 to be joined with the tank 10 in a mechanical way.

According to another feature, the shell 2 is integral with the mechanical joining interface 3, preferably in a non-removable manner. This can be achieved in that the shell 2 and the mechanical joining interface 3 are made from the same part. This can also be achieved by bonding the two parts 2, 3 together. This can also preferably be achieved by over-molding the shell 2 onto or around the mechanical joining interface 3.

The tank 10 typically comprises a base 11. This base 11 is substantially rotationally symmetrical and generally made of metal. According to a further feature, the mechanical joining interface 3 is designed to be joined to the base 11, which if necessary is arranged for this purpose.

In a first embodiment, more particularly illustrated in FIGS. 2-5, the joining is rigid. For this purpose, the base 11 comprises a shoulder 12. This shoulder 12 is, like the base 11, substantially rotationally symmetrical and is arranged around the base 11. It has a bearing surface with a normal preferably facing the outside of the tank 10. The mechanical joining interface 3 comprises a rigid surface 4 complementary to the shoulder 12. This rigid surface 4 can thus be placed against the corresponding support surface of the shoulder 12. The mechanical joining interface 3 further comprises at least one fixing feature 7 to fix the surface 4 to the shoulder 12. The fixing feature 7 may be a rivet, screw, clip, or any other equivalent, such as a welding spot. In the illustrated embodiment, the surface 4 is pierced with holes 7 into which screws or rivets pass through the surface 4 and are screwed/riveted into the base 11.

The surface 4 and the shoulder 12 can have any shape, as long as they are matched to complement each other. In one feature, the two surfaces are flat, so that they match. Such a flat shape has the advantage of being simpler to produce.

Another shape can be conical, with a positive or negative taper. Such a conical shape advantageously allows the self-centering of the surface 4 on the shoulder 12. It is also possible to add a rotational indexer in both parts 4, 12.

The base 11 is typically made of metallic material. The surface 4 can advantageously be made of metallic or rigid plastic material.

If the base 11 comprises an axially arranged tap line, both the shoulder 12 and the surface 4 are advantageously substantially centered on the tap line.

In a further embodiment, more particularly illustrated in FIGS. 6-7, the joining is flexible. For this purpose, the base 11 comprises an external or projecting annular crown 13 and the mechanical joining interface 3 comprises a ring 5, which is capable of protruding beyond the crown 13. Either the crown 13 or the ring 5, advantageously the crown 13, is rigid and the other of the crown 13 and the ring 5, advantageously the ring 5, is elastic. Thus, the elastic element can deform so as to protrude beyond the other. It is then held in position behind the other element.

It is assumed for the following that ring 5 is elastic. The ring 5 can be made of a flexible plastic, elastomer, or a metal sheet sufficiently thin to be deformable.

Depending on its elasticity, the shape of the ring 5 may vary. If it is very flexible, it can take the form of a solid ring, the whole edge of which deforms to protrude beyond the crown 13 and then remains held behind it.

If somewhat less flexible, in a further feature, more particularly illustrated in FIG. 7, the ring 5 comprises at least two tabs 6. These tabs 6 are internal in that they point towards the center of the ring 5. Their flexibility allows them to retract when the crown 13 passes over them, when the device 1 is engaged on the tank 4. Their elasticity allows them to regain their shape, once past the crown 13, and once straightened, to hold the device 1 assembled to the tank, the tabs 6 being locked behind the crown 13.

The tabs 6 can be made of plastic or metal. Their thickness and width are determined so as to obtain the desired flexibility and elasticity to allow protrusion beyond the crown 13.

According to another feature, the shell 2 is made of plastic. This plastic material is able to absorb an impact, by diffusing the energy, typically by deformation of the shell 2. The plastic material is preferably an expanded plastic, and even more preferably an expanded polystyrene.

According to another feature, the shell 2 has a shape complementary to the shape of the tank 10 in the area to be protected. Thus, if the area to be protected has a concave shape, the shell 2 has a complementary convex inner shape, so as to match the surface of the area to be protected.

In a further feature, more particularly illustrated in FIGS. 2-4, 6, the shell 2 is designed to be assembled on a hemispherical cup 15, 16 of a tank 10. Additionally, the shell 2 has a complementary hemispherical inner surface.

According to a further feature, more particularly illustrated in FIG. 8, the device 1 further comprises, on the distal edge of the shell 2, at least one clip 8, allowing attachment to the tank 10. This attachment, at the distal edge, by at least one clip 8, reduces, or even eliminates, any clearance between the shell 2 and the tank 10. This feature is applicable to both the rigid mechanical joining interface 3 and the flexible mechanical joining interface 3 described above.

The disclosure further relates to a tank 10 comprising at least one such protective device 1.

According to another characteristic, the tank 10 has a cylindrical central trunk 14, terminated at each of its two ends by a hemispherical cap 15, 16. Each of the caps 15, 16 is protected by such a protective device 1.

The disclosure has been illustrated and described in detail in the drawings and the preceding description. This should be considered as illustrative and by way of example and not as limiting the disclosure to this description alone. Numerous other embodiments are possible.

LIST OF REFERENCE SIGNS

1: device,
2: shell,
3: mechanical joining interface,
4: surface,
5: ring,
6: tab,
7: fixing feature,
8: clip,
10: tank,
11: base,
12: shoulder,
13: crown,
14: trunk,
15, 16: hemispherical cap.

The invention claimed is:

1. A protective device for a pressurized gas tank, comprising:

a shell designed to absorb energy in response to an impact; and a mechanical joining interface to mechanically join the shell to the pressurized gas tank, and wherein the shell is integral with the mechanical joining interface, and wherein the shell is made of a same part as, bonded to, or over-molded with the mechanical joining interface.

2. The protective device according to claim 1, wherein the pressurized gas tank comprises a base that is rotationally symmetrical, and the mechanical joining interface is designed to be assembled with the base.

3. The protective device according to claim 2, wherein the base comprises a shoulder that is rotationally symmetrical, and wherein the mechanical joining interface comprises a rigid surface complementary to the shoulder and at least one fixing feature to fix the rigid surface to the shoulder, as the at least one fixing feature comprising a rivet and/or a screw and/or a clamp and/or welding.

4. The protective device according to claim 1, wherein the shell is made of a plastic material.

5. The protective device according to claim 1, wherein the shell is made of an expanded plastic.

6. The protective device according to claim 1, wherein the shell is made of expanded polystyrene.

7. The protective device according to claim 1, wherein the shell has a shape complementary to a shape of the pressurized gas tank, in an area to be protected.

8. The protective device according to claim 1, wherein the shell is designed to be assembled on a hemispherical cup of the pressurized gas tank.

9. The protective device according to claim 1, further comprising, on a distal edge of the shell, at least one clip for fixing to the pressurized gas tank.

10. A pressurized gas tank, comprising at least one protective device according to claim 1.

11. The pressurized gas tank according to claim 10, having a cylindrical central trunk, terminated at each of two ends of the cylindrical central trunk by a hemispherical cap.

12. The pressurized gas tank according to claim 11, wherein each hemispherical cap is protected by a protective device comprising a shell designed to absorb energy in response to an impact, and a mechanical joining interface to mechanically join the shell to the pressurized gas tank.

13. The protective device according to claim 1, wherein the mechanical joining interface is non-removable from the shell.

14. A protective device for a pressurized gas tank, comprising:

a shell designed to absorb energy in response to an impact;

a mechanical joining interface to mechanically join the shell to the pressurized gas tank; and wherein the pressurized gas tank comprises a base that is rotationally symmetrical, and the mechanical joining interface is designed to be assembled with the base, wherein the base comprises an external crown and wherein the mechanical joining interface comprises an elastic ring, capable of protruding beyond the external crown.

15. The protective device according to claim 14, wherein the elastic ring comprises at least two internal tabs, distal ends of which are able to protrude beyond the external crown.

* * * * *